Aug. 1, 1944. F. S. EVES 2,355,039
VARIABLE PITCH PROPELLERS, PARTICULARLY FOR WATER CRAFT
Filed Jan. 15, 1943 3 Sheets-Sheet 2

Inventor
Frederick Sydney Eves
by Stevens and Davis
his attorneys

Aug. 1, 1944.　　　　　F. S. EVES　　　　　2,355,039
VARIABLE PITCH PROPELLERS, PARTICULARLY FOR WATER CRAFT
Filed Jan. 15, 1943　　　3 Sheets-Sheet 3

Inventor
Frederick Sydney Eves
by Stevens and Davis
his attorneys

Patented Aug. 1, 1944

2,355,039

UNITED STATES PATENT OFFICE 2,355,039

VARIABLE PITCH PROPELLER, PARTICULARLY FOR WATERCRAFT

Frederick Sydney Eves, Leamington Spa, England, assignor to Automotive Products Company Limited, Leamington Spa, England Application January 15, 1943, Serial No. 472,508
In Great Britain December 26, 1941

5 Claims. (Cl. 170—163)

This invention relates to variable pitch propellers, particularly for water craft, and it has for its object to provide an improved form and construction of variable pitch propeller mechanism which is especially robust and efficient in operation. The invention further sets out to provide for use in conjunction with a variable pitch propeller for water craft, an operating motor unit which is exceptionally compact and is capable of adjusting the angle of the propeller blades, even when the latter are subjected to heavy working loads.

According to the invention, regarded broadly, in an underwater propeller for driving water craft the blades are adjustable in pitch and adjustment of said blades is effected by a liquid pressure motor unit incorporated within the hub of the propeller.

Further, there is provided for driving water craft a variable pitch underwater propeller, wherein the pitch of a blade is altered by a liquid pressure motor acting through a pair of link members, the arrangement being such that when the motor is subjected to liquid pressure, tension is created in one of the links and compression in the other.

Preferably, means for adjusting the pitch angle of a blade comprise a pair of liquid pressure pistons connected respectively with the root portion of the blade by means of a pair of link members, the arrangement being such that when said pistons are subjected to liquid pressure tension is created in one of said pair of links and compression in the other.

The invention is illustrated by way of example in the accompanying diagrammatic drawings, in which—

Figure 1:
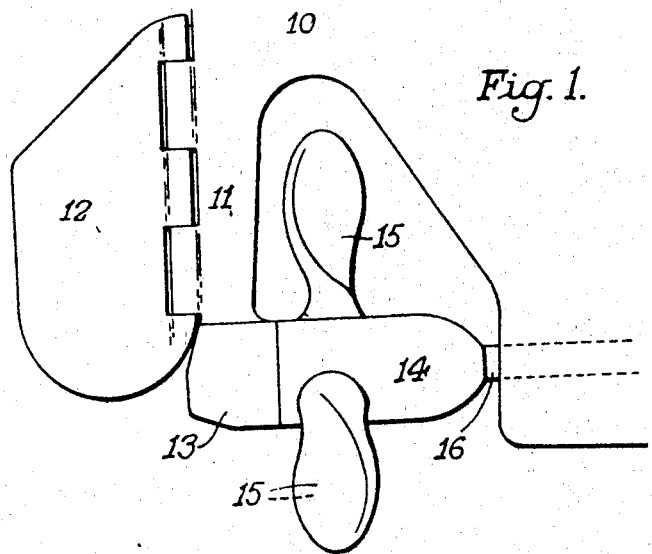
Figure 1 is a fragmentary side elevation of the stern of a vessel fitted with the improved variable pitch propeller.

In Figure 1 the stern of a steamship or other vessel is indicated at 10 and is provided with a rudder post 11 in the usual manner, which post supports a rudder 12 and also carries a bearing member 13 for pivotally supporting the boss or hub 14 of the variable pitch propeller, the blades of which latter are indicated at 15. The boss or hub 14 is, of course, secured to the rear end of a propeller shaft 16 driven by the engine or engines (not shown) of the vessel, in the usual manner.

Figure 2:
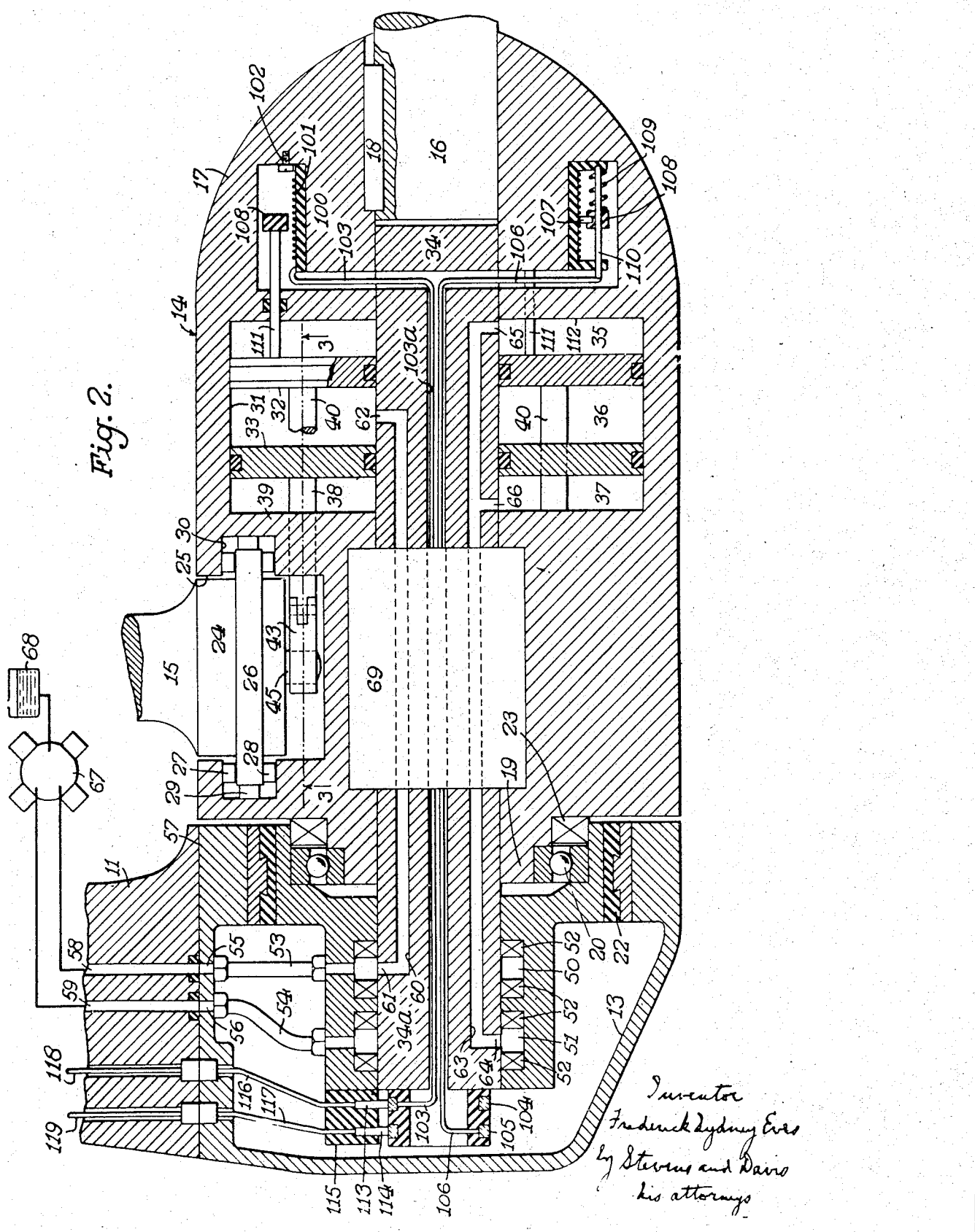
Figure 2 is a sectional side elevation drawn to an enlarged scale and showing the operating parts of the propeller hub.

The construction and internal arrangement of the boss or hub 14 and bearing member 13 are shown diagrammatically in Figure 2. It will be realised that in practice the various components of the hub 14 are designed to ensure efficient working and to enable assembly to be facilitated; the present drawings are merely diagrammatic in order that the general disposition and working of the parts may be understood as clearly as possible.

The propeller hub 14 comprises a body 17, which is secured to the propeller shaft 16, as by a key 18, said body 17 being formed at its rear end with a spigot 19, which latter is supported rotationally by means of a ball bearing assembly 20. The bearing member 13 is hollow and is fitted with a distributor housing 21 receiving the external stationary portion of the ball bearing 20. An annular cushion 22 of rubber or like material is interposed between the bearing member 13 and the distributor housing 21 so as to provide a certain amount of resilience in the mounting of the propeller hub; a rotary seal, indicated at 23, prevents the water from gaining access to the ball bearing 20 and other working parts of the propeller.

Each of the propeller blades 15, of which there are three, is formed with a substantially cylindrical root portion 24, which is fitted rotatably within a corresponding housing in the propeller hub 14, one of said housings being shown at 25. A circumferential flange 26 is formed upon the root portion 24 and is substantially rectangular in radial cross-section so as to provide an annular outer surface which is in running engagement with a series of rollers 27, a corresponding annular inner surface engaged by a series of rollers 28 and an external curved surface which is in running engagement with a series of rollers 29. These three series of rollers 27, 28 and 29 are accommodated within an annular groove 30 formed in the housing 25 and thus constitute an efficient means for rigidly supporting the propeller blade 15 against its working loads, at the same time permitting it to move angularly about the axis of the boss 24 in order to adjust the pitch angle of the propeller blade.

Figure 3:
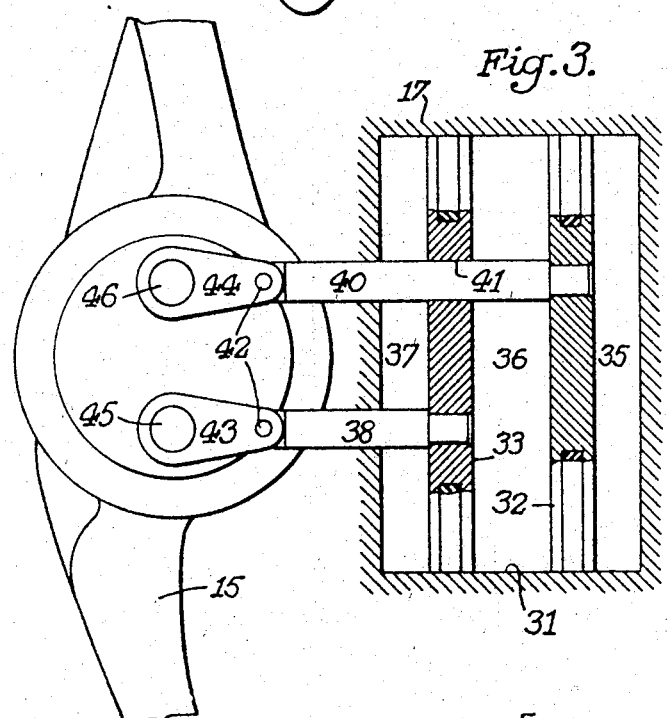
Figure 3 is a fragmentary section taken on the line 3—3 of Figure 2.

Just in advance of the housings 25 the body 17 is formed with a motor cylinder bore 31 which is co-axial with the axis of rotation of the propeller and contains a pair of sliding motor pistons 32 and 33. These are annular in form and slide upon a stub shaft 34 which extends co-axially through the motor cylinder; the interior is thus divided into three annular spaces 35, 36 and 37 by the pistons 32 and 33. For each propeller blade 15 the rear piston 33 is fitted with a control rod 38 which passes slidably but in a liquid-tight manner through the rear end wall 39 of the cylinder, as will be seen more clearly in Figure 3; also the forward piston 32 is correspondingly fitted with a control rod 40 which passes slidably but in a liquid-tight manner through the rear piston 33, as indicated at 41, said control rod 40 also passing through the rear end wall 39 of the cylinder 31. The rear ends of the control rods 38 and 40 are connected pivotally at 42 to link members 43 and 44, respectively, the rear ends of which latter engage with pins 45 and 46 provided upon the inner surface of the root portion 24 of the propeller blade at diametrically opposite positions, as will be seen in Figure 3. Thus the propeller blade 15 can be moved angularly in a clockwise direction by admitting pressure liquid to the space 36 between the pistons 32 and 33 so as to spread the latter apart, whereas on the other hand by admitting pressure liquid simultaneously to the spaces 35 and 37 the pistons 32 and 33 are moved towards one another, thus turning the propeller blade 15 in an anti-clockwise direction. It will be observed that whenever the pitch angle of the propeller blade 15 is changed the turning couple imparted to the root portion 24 is produced by a tension force in one of the link members 43 and 44, and simultaneously by a compression force in the other of said link members. As a result the forces applied to the propeller blade are substantially balanced about the axis of the root portion 24, thus largely avoiding jamming due to friction and enabling a relatively large range of pitch change to be covered without recourse to gearing or like mechanism. Moreover, by preventing the pistons 32 and 33 from becoming tilted relative to the axis of the cylinder 31 (as for instance by providing them with elongated bosses sliding snugly upon the stub shaft 34) all of the propeller blades 15 may be maintained accurately at the same pitch angle.

For the purpose of feeding pressure liquid to and from the working spaces of the motor cylinder 31, the stub shaft 34 (or an extension thereof) projects from the rear end of the body 17, as indicated at 34a, and is arranged to run within the distributor housing 21. The latter is formed internally with a pair of annular grooves 50 and 51, each of which is bounded by a pair of rotary seals 52 arranged to prevent leakage of working liquid outwards along the surface of the stub shaft 34a. These grooves 50 and 51 are connected by flexible pipes 53 and 54 respectively, with ports 55 and 56 in the upper surface 57 of the bearing member 13, the arrangement being such that when said bearing member 13 is brought into engagement with, and secured to, the lower end of the rudder post 11, said ports communicate respectively with conduits 58 and 59 extending through said rudder post 11. Suitable packing means are, of course, provided to prevent leakage of liquid across the joint between the bearing member 13 and the rudder post 11. The stub shaft 34 is formed with a longitudinal passage 60, which at its rear end terminates in a port 61 communicating permanently with the annular groove 50, while at its forward end is a port 62 leading permanently into the working space 36. In a similar manner a second longitudinal passage 63, having a port 64 at its rear end and a pair of ports 65 and 66 at its front portion, forms a permanent communication between the annular groove 51 and both of the working spaces 35 and 37 of the motor unit. The conduits 58 and 59 are connected with any suitable liquid pressure remote control system, such for instance as a reversible flow pump, which is indicated at 67 in Figure 2, and is replenished from a reservoir 68. Thus, in order to shift the blades 15 in a clockwise direction, as viewed in Figure 3, the pump 67 is operated so as to deliver pressure liquid to the conduit 58, said liquid passing through the passage 60 to the working space 36, while simultaneously the liquid in the working spaces 35 and 37 is rejected and flows through the passage 63 to the conduit 59. For making a change in the opposite sense, pressure liquid is admitted to the conduit 59 while the conduit 58 returns the rejected liquid to the pump 67 of the remote control system. If desired, the interior of the bearing member may be permanently connected with the reservoir 68 so that a pressure head of working liquid is maintained in the bearing member 13 (owing to the elevation of the reservoir 68), thus preventing any tendency for sea water to leak past the rotary seal 23.

Figure 4:
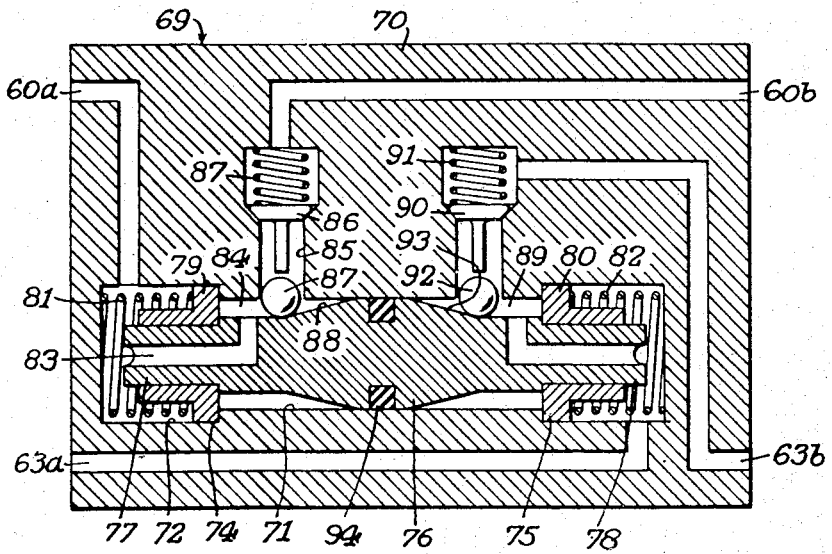
Figure 4 is a sectional elevation of the locking valve device.

Preferably a hydraulic locking device is incorporated in the propeller hub 14 and is interposed in the passages 60 and 63, said device being indicated generally at 69 in Figure 2; the internal arrangements of the parts, however, are shown diagrammatically in Figure 4. A body 70 has an eccentrically disposed longitudinal bore 71, the end portions 72 and 73 of which are enlarged to form shoulders 74 and 75, respectively. Within the central part of the bore 71 a valve releasing member 76 is slidably mounted in a liquid-tight manner and it has its reduced end portions 77 and 78 slidably mounted in stop collars 79 and 80, which are urged against the corresponding shoulders 74 and 75 by springs 81 and 82. The body 70 is formed with a passage 60a, which communicates with the port 61 by way of the passage 60, as above described, and which leads into the left-hand end of the bore 71, a passage 83 through the valve releasing member 76 serving to maintain the passage 60a in permanent communication with a space 84 in the bore 71. From this space 84 a passage 85 leads to a passage 60b by way of a non-return valve member 86, conveniently of the mushroom type, normally closed by a spring 87 so as to prevent the flow of liquid from the passage 60b to the passage 60a. The valve member 86 is, however, arranged to be opened mechanically by a thrust ball 87, which is engaged by a frusto-conical surface 88 upon the valve releasing member 76, so that as the latter moves to the left the thrust ball 87 is lifted and forces the valve member 86 off its seat. In a similar manner a passage 63a communicates with a space 89 at the right-hand part of the bore 71 and thence with a passage 63b by way of a non-return valve member 90 which is held on its seat by a spring 91 but is arranged to be opened by a thrust ball 92 lifted by at frusto-conical surface 93 of the valve releasing member 76 when the latter has moved to the right. The passage 60b, of course, communicates with the port 62 (see Figure 2); passage 63a communicates with the port 64 and passage 63b communicates with the ports 65 and 66. The centre portion of the valve releasing member 76 is provided with a packing washer 94 and when pressure liquid is fed to either of the spaces 84 or 89 it acts as a piston, said valve releasing member moving axially so as to compress the opposite spring 82 or 81. Thus, for instance, when pressure liquid is being supplied to the passage 60a from the conduit 58 it flows into the space 84 and thence into the passage 60b by opening the non-return valve 86; at the same time the valve releasing member 76 is moved to the right by the pressure of the liquid in the space 84 and so the thrust ball 92 is lifted by the portion 93, with the result that the valve 90 is mechanically opened and consequently enables the rejected working liquid to flow from the motor unit through the passage 63b to the space 89, and thence to the conduit 59 by way of the passage 63a. When, however, the flow of pressure liquid ceases the springs 81 and 82 centralize the valve releasing member 76, thus enabling the springs 87 and 91 to close the valve members 86 and 90. This, of course, seals the working liquid within the spaces 35, 36 and 37 of the motor unit, as said liquid cannot escape past the closed valves 86 and 90; therefore the setting of the propeller blades 15 is locked and cannot be altered except by admitting pressure liquid through either one of the conduits 58 and 59.

The arrangement shown in Figure 2 also includes an electrical device for indicating, at a remote position, the value of the pitch angle at any time. In normal circumstances the indication would, of course, be given at a position adjacent the pump 67 so as to form a check on the operation of the pitch changing means. Disposed within the body 17 is a tubular former 100, which is conveniently disposed concentrically with respect to the axis of rotation of the hub, said former being provided upon its outer surface with a helical coil 101 of electrical resistance wire, one end of which is "earthed" by a screw 102; the other end is connected with a cable 103 which passes through an axial passage 103a in the stub shaft 34, the opposite end of said cable being connected with an electrical slip-ring 104 upon the rear end 34a of the stub shaft. A second slip-ring 105 is connected by a cable 106 with a sliding tapping 107, adapted to make contact with any of the turns of the winding 101. For convenience the tapping 107 is mounted upon a ring 108 of insulating material, which is urged to the left by a number of circumferentially spaced coiled compression springs, one of which is indicated at 109. The tapping 107 is in electrical connection with a rod 110, which is fixed to but insulated from the body 17 and serves as a terminal for the cable 106. The ring 108 is slid axially in unison with the piston 32 by means of circumferentially spaced rods 111 which slide in a liquid-tight manner through the front wall 112 of the cylinder 31 and bear upon the ring 108. A pair of brushes 113 and 114 mounted in an insulating block 115 cooperate with the slip rings 104 and 105, respectively, and are coupled by cables 116 and 117 with cables 118 and 119 extending upwards through the rudder post 11, readily detachable plug or like connectors 120 and 121 preferably being provided so as to enable the bearing member 13 to be removed from or applied to the rudder post 11 without having to interfere with the electrical wiring.

Figure 5:
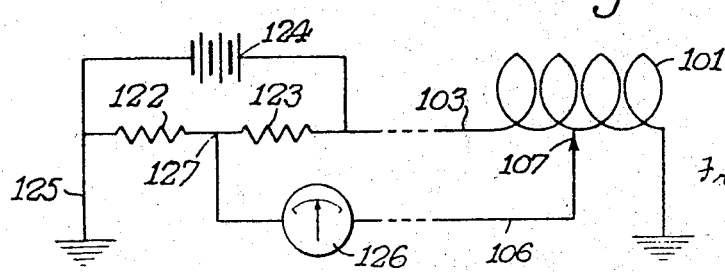
Figure 5 is a diagram of the electrical connections of the indicating system.

The circuit of the indicating system is shown in Figure 5. The winding 101 with its tapping 107 constitutes two arms of a Wheatstone bridge circuit, having a pair of fixed resistances 122 and 123 connected in series with a battery 124 or other source of current. The resistance 122 is "earthed" at 125, while an instrument 126, such as a specially calibrated galvanometer, is connected between a tapping 107 and the point 127 between the resistances 122 and 123. The galvanometer 126 is thus responsive to the potential difference between the point 127 and the tapping 107, so that as said tapping moves along the resistance 101 in accordance with changes in the pitch angle of the propeller blades 15, the galvanometer pointer shifts accordingly and indicates the setting of the propeller blades.

The blades 15 of the propeller may, of course, be arranged to have their pitch angle variable in either direction from the zero setting, i. e., that setting in which the effective pitch angle is substantially 0°, as this enables the steamship or equivalent to be driven backwards without the necessity of providing a reverse gear or reversing mechanism in connection with the engines, since the propeller shaft 16 can be driven always in the same direction. Moreover, it may be desirable in some cases for the effective pitch angle (usually in the "forward" direction) to be increased to substantially 90° when the propeller in question is out of use so that said propeller then creates the minimum amount of drag, tending to retard the forward motion of the vessel when the latter is being towed or driven by means other than the propeller in question. This position of 90° pitch angle is usually termed the "feathered" position. Where such provision is made, however, it is desirable that the blades should not be unwittingly moved to their "feathered" position, especially when the propeller is being driven, for this would impose considerable strain on the working parts and is quite likely to cause damage. With a view to avoiding this occurrence a safety device may be incorporated in the means used for varying the pitch of the blades, and one suitable arrangement is shown diagrammatically in Figure 6. A control unit is provided and comprises a body 130, having a longitudinal bore within which a combined plunger and piston valve member 131 is slidable towards the right under the action of liquid pressure in an end space 132, and towards the left under the action of a spring 133. The member 131 is also operable manually by a knob 134, with which it is connected by a stem 135, said stem having a notch 136 adapted to be engaged by the rounded tip of a Z-shaped catch 137, which is pivoted at 138 to a fixed support and is urged into engagement with the notch 136 by a spring finger 139. The catch 137 is arranged to be held in its engaged position, as shown, by means of a J-shaped trigger 140, which is pivoted to a fixed support at 141, and is urged in an anti-clockwise direction by a spring finger 142. The upstanding portion of the trigger 140 is connected with the armature 143 to an electro-magnetic solenoid 144, the arrangement being such that, when said solenoid is energised, the armature 143 moves to the right, thus causing the armature of the trigger 140 to release the catch member 137 so that the member 131 can be moved axially, the edge of the notch 136 depressing the catch 137 and allowing free movement of the stem 135. The valve member 131 is formed with a circumferential groove 145 which, when said member is in its left-hand position, connects together a pair of passages 146 and 147; the first of these leads by a pipe 148 to the reservoir 68, while the second is connected with the conduit 58. The space 132 at the left-hand end of the body 130 is connected, as shown, with the conduit 59. The body 130 is also fitted with a piston 148 which slides within a control cylinder 149 connected with the conduit 58 a pipe 150. The piston 148, when moved by pressure liquid in the cylinder 149, acts to close a pair of electrical contact members 151 and 152, the contact, however, being broken as soon as the pressure in the cylinder 149 falls below the working pressure. There is also provided in the hub itself a pair of contacts, which are indicated at 153 and 154 in Figure 6; the contact 153 is conveniently carried by the body of the propeller hub, while the contact 154 is movable with the piston 32 and is arranged to engage with the contact 153 as the pitch angle of the blades in the forward direction reaches a predetermined maximum value, the contact, however, being broken when said angle is substantially exceeded. A source of current, such as a battery 155, is connected in series with the solenoid 144, the contacts 151, 152, 153 and 154.

Figure 6:
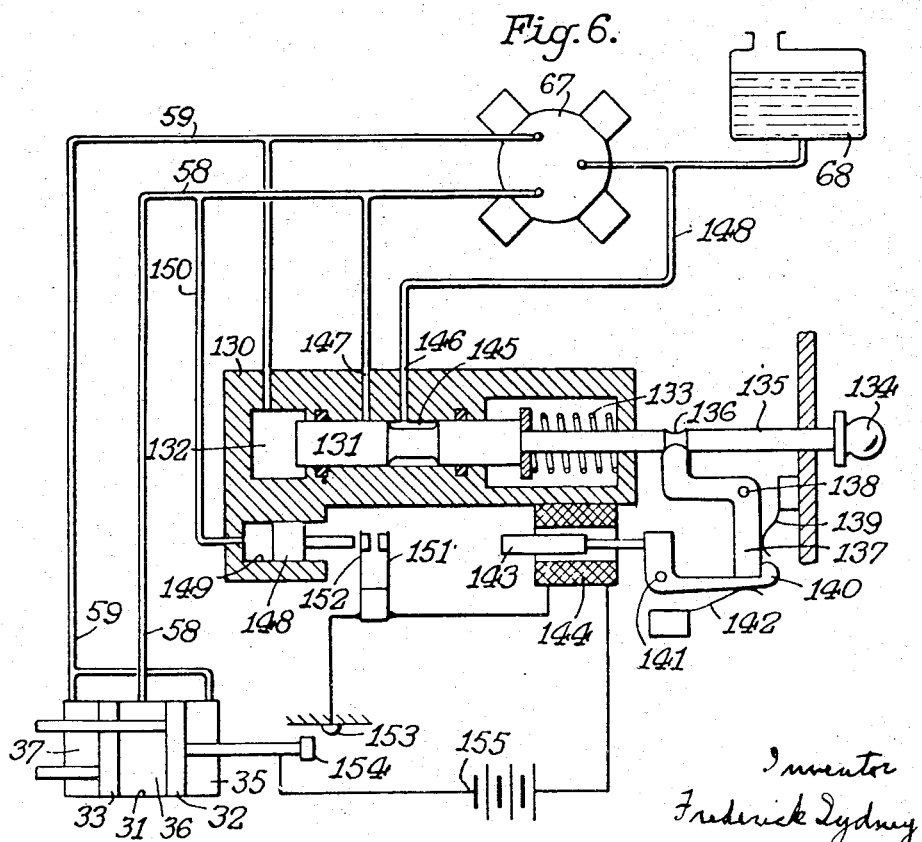
Figure 6 is a diagram showing a safety system for use when the pitch angle of the propeller blades is adapted to be increased until said blades are feathered.

The safety device shown in Figure 6 operates as follows. The motor cylinder unit comprising cylinder 31 and pistons 32 and 33 is arranged as before and is adapted to increase the pitch angle of the blades in the forward direction when pressure liquid is applied through the duct 58, whereas the pitch angle in the forward direction is reduced (or the pitch angle in the "reverse" direction is increased) by supplying pressure liquid to the duct 59. In normal operation, the parts occupy the positions shown and so long as the pitch angle of the blades in the forward direction does not reach its maximum working value the safety system is inoperative. It will be noted, however, that whenever pressure liquid is fed to the conduit 58 the piston 148 is moved along the cylinder 149 and closes the contacts 151 and 152 but no current flows as the contacts 153 and 154 are separated. When the maximum working pitch angle is exceeded however contact is also established at 153, 154 so that the solenoid 144 is energised, thus releasing the trigger 140 and freeing the catch 137 so that the spring 133 is then able to slide the valve member 131 to its left-hand position in which the groove 145 connects together the passages 146 and 147. It will be seen that this automatically connects the conduit 58 with the reservoir 68 so that pressure can no longer exist in the conduit 58, and therefore further increase in the pitch angle of the blades is prevented, even although the pump 67 may continue to operate. Moreover, the absence of pressure in the conduit 58 enables the contacts 151 and 152 to separate, thus breaking the circuit through the solenoid 144. The next time the pump 67 is operated in the other direction, to feed pressure liquid through the conduit 59 for reducing the pitch angle, pressure liquid is again admitted to the space 132 and this forces the piston valve member 131 back to its original position by compressing the spring 133, the trigger 140 springing back into engagement with the catch 137 as the upper part of the latter re-enters the notch 136.

When it is desired to move the propeller blades to their "feathered" position, the knob 134 is held out manually while the pump 67 is operated to feed pressure liquid to the conduit 58; thus when the solenoid 144 becomes energised owing to contacts 153, 154 coming into engagement, the valve member 131 is retained in its normal working position, and as the pitch angle continues to increase the contact 154 soon leaves the contact 153, thus again de-energising the solenoid 144. The operator can then let go of the knob 134 as the valve member 131 is again mechanically held by the catch 137 acting in conjunction with the trigger 140. It will be seen that when the pitch angle is subsequently reduced there is no liquid pressure in the cylinder 149, so that the contacts 151 and 152 are separated and the solenoid 144 therefore remains inoperative while the contact 154 passes the contact 153.

It will, of course, be understood that the construction which has been described is given merely by way of example and that the arrangement and design of the parts may be modified in numerous ways so as to suit requirements. For instance, the hub may be provided with any number of propeller blades, and these may if desired be controlled in pitch by forms of hydraulic motor other than that illustrated. If desired, a single piston may be utilised for changing the pitch of the propeller blades, but the described dual piston arrangement is preferred, as this not only steadies the propeller blades but also enables a smooth action to be obtained over a relatively large range of angular movements, the strain on the propeller blades during operation being efficiently absorbed by the pistons and their control rods and links.

What I claim is:

1. A variable pitch propeller unit comprising, a hub member, a propeller shaft, means establishing a driving connection between said hub member and said propeller shaft, a plurality of propeller blades, each blade being mounted in said hub member for angular pitch adjustment about a substantially radial axis, said hub member defining an interior cylinder, a pair of pistons axially slidable in said cylinder dividing the same into a middle working space and two end working spaces, a set of piston rods, one for each propeller blade, all of the piston rods of said set being secured to a common piston and extending slidably through one end wall of the cylinder, a further set of piston rods, one for each propeller blade and all secured in common to the other piston and extending slidably through the first named piston and through said end wall of the cylinder, a pair of links connecting each propeller blade at diametrically opposed points with one piston rod of each set, and means for selectively introducing pressure fluid into either the middle working space or the end working spaces to either spread the pistons apart to move all the propeller blades angularly in one direction or to move the pistons together to move all the propeller blades angularly in the other direction.

2. A variable pitch propeller unit comprising, a hub member, a propeller shaft, means establishing a driving connection between said hub member and said propeller shaft, a plurality of propeller blades, each blade being mounted in said hub member for angular pitch adjustment about a substantially radial axis, said hub member defining an interior cylinder; a stub shaft extending concentrically through said cylinder, a pair of annular pistons axially slidable on said stub shaft dividing said cylinder into a middle annular working space and two end annular working spaces, a set of piston rods, one for each propeller blade, all of the piston rods of said set being secured to a common piston and extending slidably through one end wall of the cylinder, a further set of piston rods, one for each propeller blade and all secured in common to the other piston and extending slidably through the first named piston and through said end wall of the cylinder, a pair of links connecting each propeller blade at diametrically opposed points with one piston rod of each set, and means for selectively introducing pressure fluid into either the middle working space or the end working spaces through said stub shaft to either spread the pistons apart to move all the propeller blades angularly in one direction or to move the pistons together to move all the propeller blades angularly in the other direction.

3. A variable pitch propeller unit comprising, a hub member, a propeller shaft, means establishing a driving connection between said hub member and said propeller shaft, a plurality of propeller blades, each blade being mounted in said hub member for angular pitch adjustment about a substantially radial axis, said hub member defining an interior cylinder, a stub shaft extending concentrically through said cylinder, a pair of annular pistons axially slidable on said stub shaft and dividing the cylinder into a middle annular working space and two end annular working spaces, said stub shaft having a pair of conduits extending therethrough, a port opening from one of said conduits into the middle annular working space, a pair of ports opening through the other conduit into said end annular working spaces, a set of piston rods, one for each propeller blade, all of the piston rods of said set being secured to a common piston and extending slidably through one end wall of the cylinder, a further set of piston rods, one for each propeller blade and all secured in common to the other piston and extending slidably through the first named piston and through said end wall of the cylinder, a pair of links connecting each propeller blade at diametrically opposed points with one piston rod of each set and stationary means communicating with the conduits in said stub shaft for selectively introducing pressure fluid into one or the other of said conduits so as to introduce pressure fluid into either the middle working space or the end working spaces to either spread the pistons apart to move all the propeller blades angularly in one direction or to move the pistons together to move all the propeller blades angularly in the other direction.

4. A variable pitch propeller unit comprising, a hub member, a propeller shaft, means establishing a driving connection between said hub member and said propeller shaft, a stationary housing at the end of said hub remote from said propeller shaft, means mounting said hub for rotation in said housing, a plurality of propeller blades, each blade being mounted in said hub member for angular pitch adjustment about a substantially radial axis, said hub member defining an interior cylinder, a stub shaft extending concentrically through said hub and into said housing, said stub shaft passing concentrically through said cylinder, a pair of annular pistons axially slidable on said stub shaft in said cylinder dividing the same into a middle annular working space and two end annular working spaces, a set of piston rods, one for each propeller blade, all of the piston rods of said set being secured to a common piston and extending slidably through one end wall of the cylinder, a further set of piston rods, one for each propeller blade and all secured in common to the other piston and extending slidably through the first named piston and through said end wall of the cylinder, a pair of links connecting each propeller blade at diametrically opposed points with one piston rod of each set, said stub shaft having a pair of conduits therethrough, one of said conduits terminating in a port in communication with the middle annular working space and the other of said conduits terminating in ports communicating with said end annular working spaces, each conduit also having a port opening into said housing, means constituting the part of said housing defining an annular groove in communication with each of said last named ports, and means for introducing pressure fluid into either of the annular grooves whereby either the middle annular working space or the two end annular working spaces may be supplied with pressure fluid to either spread the pistons apart to move all the propeller blades angularly in one direction or to move the pistons together to move all the propeller blades angularly in the other direction.

5. A variable pitch propeller unit as claimed in claim 4, further comprising normally closed check valves in both of the conduits in said stub shaft preventing flow of pressure fluid away from any of said working spaces, and means responsive to the introduction of pressure fluid in the housing end of either of said conduits for opening both of said check valves.

FREDERICK SYDNEY EVES.